(12) United States Patent
Hamar

(10) Patent No.: US 11,953,170 B1
(45) Date of Patent: Apr. 9, 2024

(54) ILLUMINATION DEVICE FOR MOTOR VEHICLE HEADLAMP FOR GENERATING LIGHT DISTRIBUTION

(71) Applicant: ZKW Group GmbH, Wieselburg (AT)

(72) Inventor: Martin Hamar, Olomouc (CZ)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/379,735

(22) Filed: Oct. 13, 2023

(30) Foreign Application Priority Data

Oct. 21, 2022 (EP) ..................................... 22202973

(51) Int. Cl.
| | | |
|---|---|---|
| *F21V 5/04* | (2006.01) | |
| *F21S 41/143* | (2018.01) | |
| *F21S 41/24* | (2018.01) | |
| *F21S 41/25* | (2018.01) | |

(52) U.S. Cl.
CPC ............. *F21S 41/24* (2018.01); *F21S 41/143* (2018.01); *F21S 41/25* (2018.01)

(58) Field of Classification Search
CPC ........... F21W 2102/20; F21W 2102/13; F21W 2103/55; F21W 2102/135; F21W 2103/00; F21W 2102/00; F21S 43/14; F21S 43/26; F21S 41/27; F21S 41/322; F21S 43/315; F21S 43/40; F21S 41/25; F21S 41/32; F21S 43/20; F21S 43/31; F21S 41/24; F21S 43/235; F21Y 2115/10
See application file for complete search history.

(56) References Cited

U.S. PATENT DOCUMENTS

| 10,288,248 B1 | 5/2019 | Crespin et al. | |
| 2011/0096561 A1* | 4/2011 | Owada | F21S 41/265 |
| | | | 362/521 |
| 2017/0059835 A1 | 3/2017 | Griffith et al. | |
| 2017/0184267 A1* | 6/2017 | Courcier | F21S 41/663 |
| 2018/0118090 A1* | 5/2018 | Lee | F21S 43/243 |
| 2022/0186902 A1 | 6/2022 | Lim et al. | |

FOREIGN PATENT DOCUMENTS

DE 102017117560 A1 2/2019

OTHER PUBLICATIONS

Extended European Search Report for European Patent Application No. 22202973.8 dated Mar. 6, 2023 (8 Pages).

* cited by examiner

*Primary Examiner* — Elmito Breval
(74) *Attorney, Agent, or Firm* — Eversheds Sutherland (US) LLP

(57) ABSTRACT

Illumination device (ID) for a motor vehicle headlamp. The ID includes a light source for emitting a light beam (LB) with a first vertical extent (VE), an optic body (OB) for guiding the LB, and an optical system for projecting the LB in front of the ID. The OB includes a first pair of optically operative surfaces for guiding the LB coupled into the OB. The first pair of optically operative surfaces consists of a first and second light deflection surface configured to deflect the LB while travelling through the OB. The first and second light deflection surfaces are configured such that light rays forming the LB are essentially parallel to each other and to a main direction after being coupled out of the OB. The outcoupled parallel LB has a second VE in the main vertical cross section, wherein the second VE is greater than the first VE.

12 Claims, 3 Drawing Sheets

ILLUMINATION DEVICE FOR MOTOR VEHICLE HEADLAMP FOR GENERATING LIGHT DISTRIBUTION

CROSS-REFERENCE TO RELATED APPLICATIONS

This application claims priority to European Patent Application No. 22202973.8, filed Oct. 21, 2022, which is incorporated herein by reference.

FIELD OF THE INVENTION AND DESCRIPTION OF PRIOR ART

The invention relates to an illumination device for a motor vehicle headlamp for generating a light distribution, said illumination device comprises:
- a light source configured to emit at least one light beam in a main direction of the illumination device,
- an optic body arranged downstream of the light source along the main direction, wherein the optic body comprises
  a light input section for coupling the light beam from the light source into the optic body, said light input section comprising a light collecting element, which is assigned to the light source and is configured to couple the light beam from the assigned light source into the optic body in such a way, that light rays forming the light beam are essentially parallel to each other and essentially parallel to the main direction after being coupled into the optic body, wherein the parallel light beam has a first vertical extent in a main vertical cross section—seen in a correct installed state of the illumination device in a vehicle—, when being coupled into the optic body, said main vertical cross section is parallel to the main direction,
  a light output section for decoupling the light beam coupled into the optic body via the light input section, out of the optic body in the main direction,
  a shell surface limiting the optic body, said shell surface is configured to deflect the light beam coupled into the optic body, which shell surface extends between the light input section and the light output section,
- an optical system, comprising at least one optical element, arranged downstream of the optic body along the main direction in order to receive the light beam emitted from the light output section of the optic body, wherein the optical system is configured to project the light beam in front of the illumination device,
- wherein the optical system in combination with the light source and the optic body are configured to generate the light distribution.

Further, the invention relates to a motor vehicle headlamp comprising an illumination device.

In the prior art, illumination devices for use in a motor vehicle headlamp for generating a light distribution are well known. Typically, a light source creates and emits light, which is guided to an optical system via an optic body, e.g. a light guide. The optical system is configured to create a specific light function or light distribution (e.g. a low beam light distribution, a high beam light distribution, etc.) with the light received from the light source via the optic body. In the prior art, optic bodies usually are planar light guides, configured to guide light to a specific location, e.g. a light input surface of the optical system. Such planar light guides (or light guide optics) can also compensate for an off-axis arrangement of the light source and the optical system, wherein such arrangement is due to the design of the illumination device or the headlamp which uses the illumination device. Due to their characteristics, planar light guides are not able to affect the size and the divergency of light beams or light rays which are guided through the light guide. Therefore, the possible light output from a planar light guide is rather limited. In order to modify the size and divergency of light beams, usually, additional optical elements such as lenses are being used.

SUMMARY OF THE INVENTION

It is an object of the invention to provide an illumination device with an optic body, which is capable of modifying its light output characteristics.

This object is achieved with an illumination device according to claim 1. Preferred embodiments are described in depended claims. The object can also be achieved by a motor vehicle headlamp comprising at least one illumination device according to the invention.

According to a first aspect of the invention, the optic body comprises a first pair of optically operative surfaces for guiding the light beam coupled into the optic body via the light input section along a first light beam path from the light input section to the light output section,
- wherein the first pair of optically operative surfaces consists of a first and second light deflection surface, wherein the first and second light deflection surfaces are arranged on the shell surface, wherein the optic body comprises a first and a second side arranged opposite to each other, wherein the first light deflection surface is arranged on the first side and the second light deflection surface is arranged on the second side of the optic body,
- wherein in the main vertical cross section the first light deflection surface follows a first parabola, wherein the second light deflection surface follows a second parabola, wherein the first and second light deflection surfaces are arranged on the shell surface in such a way that the first and second parabola have a common first focal point,
- wherein the light beam following the first light beam path is incident on the first light deflection surface and is deflected to the second light deflection surface, and wherein the deflected light beam is incident on the second light deflection surface and is deflected to the light output section for coupling out of the optic body,
- wherein the light output section comprises a first light exit surface, wherein the first pair of optically operative surfaces and the light output section are arranged in such a way, that the light beam deflected by the second light deflection surface is incident on the first light exit surface,
- wherein the first and second light deflection surfaces and the first light exit surface are configured in such a way, that light rays forming the light beam are essentially parallel to each other and essentially parallel to the main direction after being coupled out of the optic body, wherein the outcoupled parallel light beam has a second vertical extent in the main vertical cross section, said second vertical extent is greater than the first vertical extent.

The illumination device according to the invention has the advantage, that the light beam gets broadened (or widened) while travelling through the optic body, therefore the divergence of the light beam can be decreased, which can reduce unwanted optical effects, e.g. chromatic aberration. This provides greater variety in the possible light functions which can be created with the illumination device. In particular, the optic body acts as a so-called beam expander, because the diameter of the light beam is expanded while travelling through the optic body. When considering a 3D view of the optic body, the first pair of optically operative surfaces can also be described as paraboloids or truncated paraboloids (in 3D). Divergency can by understood as essentially an angle between adjacent light rays along the direction of light propagation. Divergency can also be described as a beam divergence, which can be described as an angular measure of the increase in beam diameter or radius with distance from an element (e.g. a light source) from which the beam emerges. Beam divergence usually refers to a beam of circular cross section. A beam may, for example, also have an elliptical cross section, in which case the orientation of the beam divergence has to be specified, for example with respect to the major or minor axis of the elliptical cross section. Preferably, the optical system, in particular the at least one optical element, is configured to invert (along a vertical axis or plane) the light pattern received from the optic body. In general, if the beam diameter gets wider, divergence gets lower.

Advantageously the light source is configured to emit a second light beam, wherein the optic body comprises a second pair of optically operative surfaces for guiding the second light beam coupled into the optic body via the light input section along a second light beam path from the light input section to the light output section, wherein the second light beam has a third vertical extent in the main vertical cross section, when being coupled into the optic body, wherein the second pair of optically operative surfaces consists of a third and fourth light deflection surface, wherein the third and fourth light deflection surfaces are arranged on the shell surface, wherein the third light deflection surface is arranged on the first side and the forth light deflection surface is arranged on the second side of the optic body, wherein in the main vertical cross section the third light deflection surface follows a third parabola, wherein the forth light deflection surface follows a forth parabola, wherein the third and fourth light deflection surfaces are arranged on the shell surface in such a way, that the third and fourth parabola have a common second focal point, wherein the second light beam following the second light beam path is incident on the third light deflection surface and is deflected to the forth light deflection surface, and wherein the deflected second light beam is incident on the forth light deflection surface and is deflected to the light output section for coupling out of the optic body, wherein the light output section comprises a second light exit surface, wherein the second pair of optically operative surfaces and the light output section are arranged in such a way, that the light beam deflected by the fourth light deflection surface is incident on the second light exit surface, wherein the third and fourth light deflection surfaces are configured in such a way, that light rays of the second light beam are essentially parallel to each other and essentially parallel to the main direction after being coupled out of the optic body, wherein the outcoupled essentially parallel light beam has a forth vertical extent in the main vertical cross section, said forth vertical extent is smaller than the third vertical extent.

This has the advantages, that the first pair of optically operative surfaces can act as a beam expander and the second pair of optically operative surfaces can act as a beam compressor, wherein the expander broadens the cross section of a first portion of the light beam (i.e. the at least one light beam) and the compressor narrows the cross section of a second portion of the light beam (i.e. the second light beam). Advantageously, a first portion of the total light beam being emitted by the light source can be compressed while a second portion of the total light beam can be expanded, wherein the expansion and the compression can be achieved by the first and second part of optically operative surfaces respectively.

Advantageously the first, second, third and fourth light deflection surface are arranged in such a way, that a fictional plane, which intersects the common first focal point and the common second focal point, intersects the optic body at an intersection line, wherein the optical body is configured in such a way that the first light deflection surface lies vertically higher relative to the intersection line than the third light deflection surface.

Advantageously the generated light distribution comprises a first partial light distribution and a second partial light distribution, wherein the at least one light beam coupled out of the first light exit surface forms the first partial light distribution, wherein the second light beam coupled out of the second light exit surface forms the second partial light distribution. In other words, the expanded light beam is used to form the first partial light distribution and the compressed light beam is used to form the second partial light distribution.

Advantageously the generated light distribution is a low beam light distribution, wherein a vertical extension of the low beam light distribution extends along a VV-line from at least 0° down to at least −10° on the VV-line.

Advantageously a center of the first partial light distribution is closer to the 0° line of the VV-line than a center of the second partial light distribution. Alternatively, the first pair of optically operative surfaces and the second pair of optically operative surfaces can be arranged in such a way, that a center of the second partial light distribution is closer to the 0° line of the VV-line than a center of the first partial light distribution. In other words, the vertically higher light distribution can be created by the compressed or the expanded light beam, depending on the arrangement of the first and second pair of optically operative surfaces.

Advantageously the first and third light deflection surface are arranged on a same side of the shell surface of the optic body.

Advantageously the second and forth light deflection surface are arranged on a same side of the shell surface of the optic body.

Advantageously the first and second light deflection surface have a concave curvature and the third and fourth light deflection surface have a convex curvature.

Advantageously light rays forming the at least one light beam have a first divergence in the main vertical cross section along the main direction, wherein the light rays forming the at least one light beam after being coupled out of the optic body have a second divergence in the main vertical cross section, wherein said second divergence is smaller than the first divergence.

Advantageously light rays forming the second light beam have a third divergence in the main vertical cross section along the main direction, wherein the light rays forming the second light beam after being coupled out of the optic body have a fourth divergence in the main vertical cross section, wherein said fourth divergence is greater than the third divergence.

Advantageously, the fourth divergence (of the compressed, second light beam) is also greater than the second divergence of the at least one (or first) light beam. The lower (or smaller), second divergence is the result of the wider (or expanded) at least one light beam. As a result, the at least one light beam is hitting the projection lens at smaller angles and thus the chromatic aberration or other color effects are reduced.

According to another aspect of the invention, a motor vehicle headlamp is provided, comprising an illumination device.

The terms "up", "down", "vertical", "horizontal", "forward", "front", "backward" and "back" are to be understood from an illumination device in a correctly installed state in a vehicle headlamp or in a vehicle.

BRIEF DESCRIPTION OF THE FIGURES

In the following, in order to further demonstrate the present invention, illustrative and non-restrictive embodiments are discussed, as shown in the drawings, which show.

DETAILED DESCRIPTION OF EMBODIMENTS OF THE INVENTION

Figure 1:
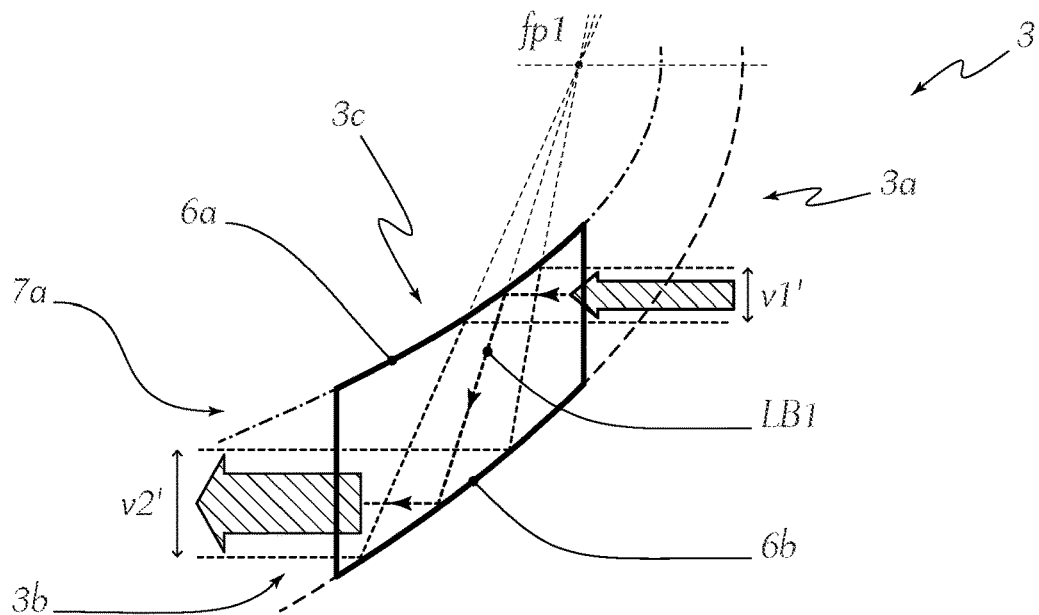
FIG. 1 a schematic side view of an optic body of a first embodiment of an illumination device according to the invention.

FIG. 1 shows a schematic side view of an optic body 3 of a first embodiment of an illumination device 1 for a motor vehicle headlamp.

Figure 2:
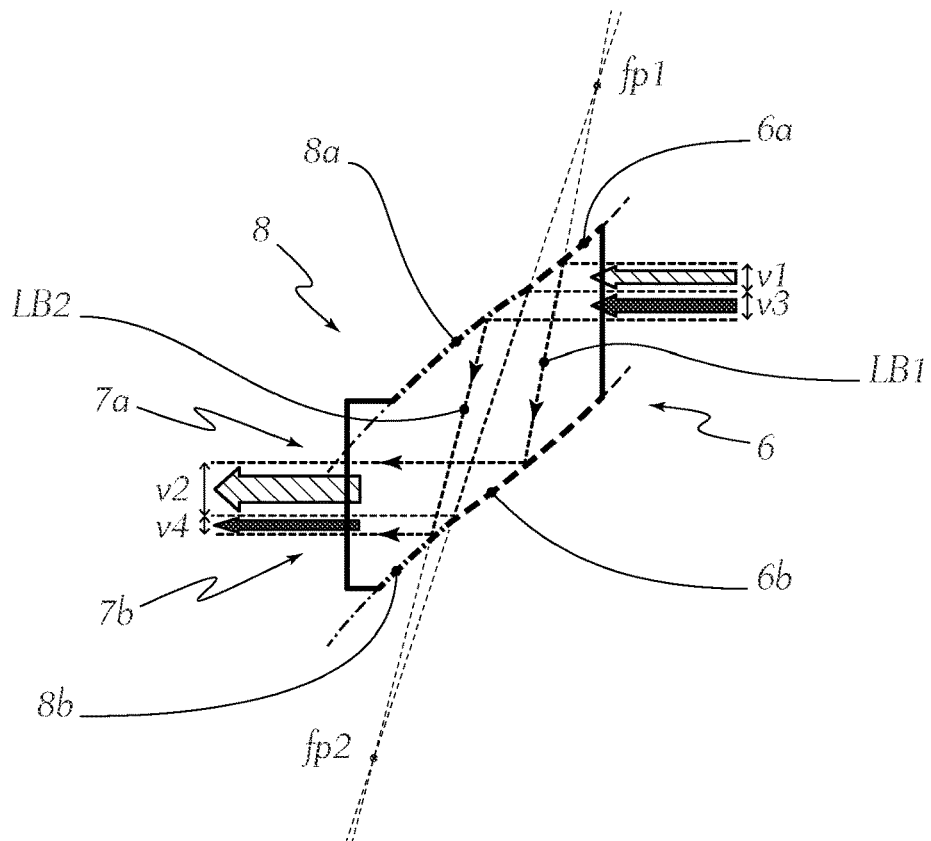
FIG. 2 a schematic side view of an optic body of a second embodiment of an illumination device according to the invention.
Figure 3:
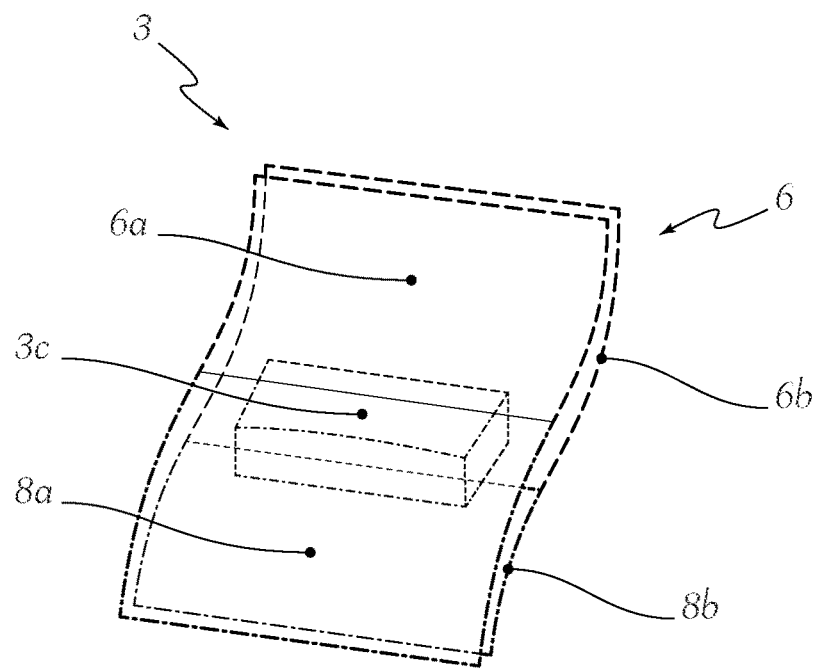
FIG. 3 a perspective view of an optic body.

FIG. 2 shows an optic body 3 of a second embodiment, described in more detail below. A perspective view of the optic body according to the second embodiment is shown in FIG. 3.

The illumination device 1 (as seen on FIG. 4) comprises a light source 2 configured to emit at least one light beam in a main direction X of the illumination device 1. The optic body 3 is arranged downstream of the light source 2 along the main direction X.

FIG. 1 shows a schematic view of the optic body 3, which comprises a light input section 3a for coupling the light beam (indicated by the hatched arrow) from the light source 2 into the optic body 3. The light input section 3a comprises a light collecting element 4 (seen in FIG. 4), which is assigned to the light source 2 and is configured to couple the light beam from the assigned light source 2 into the optic body 3 in such a way, that light rays forming the light beam are essentially parallel to each other and essentially parallel to the main direction X after being coupled into the optic body 3. The parallel light beam has a first vertical extent v1' in a main vertical cross section v—seen in a correct installed state of the illumination device 1 in a vehicle—, when being coupled into the optic body 3, said main vertical cross section v is parallel to the main direction X.

The optic body 3 comprises a light output section 3b for decoupling the light beam coupled into the optic body 3 via the light input section 3a, out of the optic body 3 in the main direction X. The optic body 3 further comprises a shell surface 3c limiting the optic body 3, said shell surface 3c is configured to deflect the light beam coupled into the optic body 3. The shell surface 3c extends between the light input section 3a and the light output section 3b.

Figure 4:
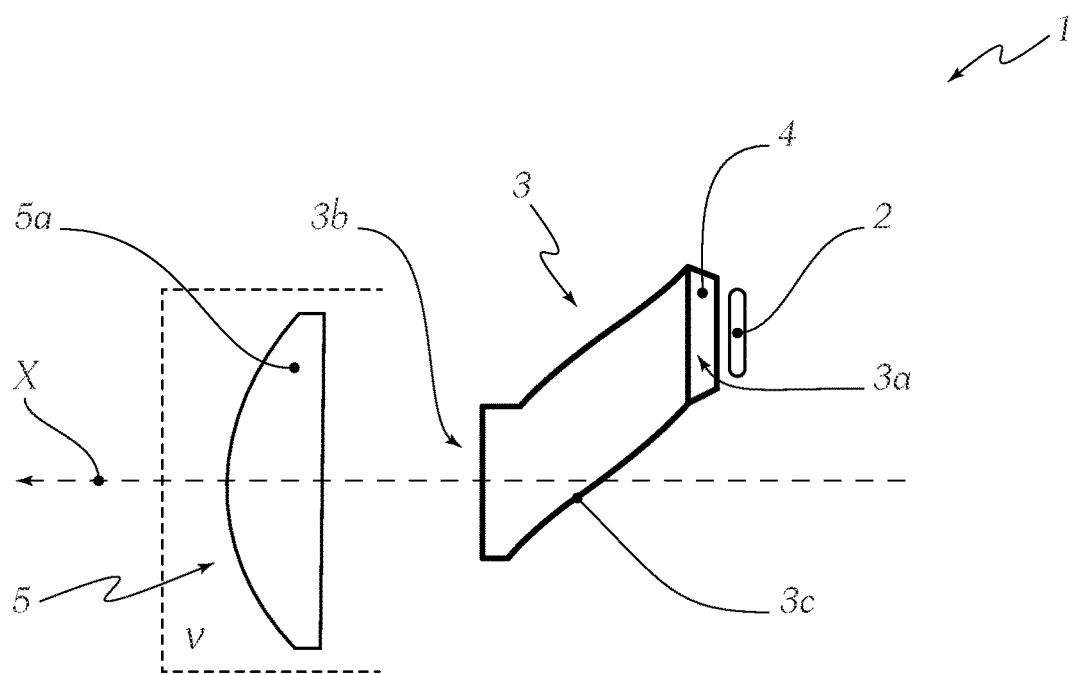
FIG. 4 a schematic view of the illumination device according to the second embodiment.

As seen in FIG. 4, the illumination device 1 comprises an optical system 5, comprising at least one optical element 5a, arranged downstream of the optic body 3 along the main direction X in order to receive the light beam emitted from the light output section 3b of the optic body 3. The optical system 5 is configured to project the light beam in front of the illumination device 1. The optical system 5 in combination with the light source 2 and the optic body 3 are configured to generate the light distribution. The generated light distribution can be a low beam light distribution, wherein a vertical extension of the low beam light distribution extends along a VV-line from at least 0° down to at least −10° on the VV-line.

The optic body 3 comprises a first pair of optically operative surfaces 6 for guiding the light beam coupled into the optic body 3 via the light input section 3a along a first light beam path LB1 from the light input section 3a to the light output section 3b. The first pair of optically operative surfaces 6 consists of a first and second light deflection surface 6a, 6b, wherein the first and second light deflection surfaces 6a, 6b are arranged on the shell surface 3c. The optic body 3 comprises a first and a second side arranged opposite to each other, wherein the first light deflection surface 6a is arranged on the first side and the second light deflection surface 6b is arranged on the second side of the optic body 3.

In the main vertical cross section v the first light deflection surface 6a follows a first parabola, wherein the second light deflection surface 6b follows a second parabola, wherein the first and second light deflection surfaces 6a, 6b are arranged on the shell surface 3c in such a way that the first and second parabola have a common first focal point fp1. The light beam following the first light beam path LB1 is incident on the first light deflection surface 6a and is deflected to the second light deflection surface 6b. The deflected light beam is incident on the second light deflection surface 6b and is deflected to the light output section 3b for coupling out of the optic body 3.

The light output section 3b comprises a first light exit surface 7a, wherein the first pair of optically operative surfaces 6 and the light output section 3b are arranged in such a way, that the light beam deflected by the second light deflection surface 6b is incident on the first light exit surface 7a. The first and second light deflection surfaces 6a, 6b and the first light exit surface 7a are configured in such a way, that light rays forming the light beam are essentially parallel to each other and essentially parallel to the main direction X after being coupled out of the optic body 3. The outcoupled parallel light beam has a second vertical extent v2' in the main vertical cross section v, said second vertical extent v2' is greater than the first vertical extent v1'. This is indicated in the broader hatched arrow on the left side of the optical body 3. The optic body 3 acts as a beam expander in the embodiment shown in FIG. 1.

In the embodiment shown in FIG. 2, the light source 2 is configured to emit a second light beam (or a light beam comprising two portions) and the optic body 3 comprises a second pair of optically operative surfaces 8 for guiding the second light beam coupled into the optic body 3 via the light input section 3a along a second light beam path LB2 from the light input section 3a to the light output section 3b. The second light beam has a third vertical extent v3 in the main vertical cross section v, when being coupled into the optic body 3. The second light beam is depicted by a black arrow.

The second pair of optically operative surfaces 8 consists of a third and fourth light deflection surface 8a, 8b. The third and fourth light deflection surfaces 8a, 8b are arranged on the shell surface 3c. The third light deflection surface 8a is arranged on the first side and the forth light deflection surface 8b is arranged on the second side of the optic body 3. In the main vertical cross section v the third light deflection surface 8a follows a third parabola and the forth light deflection surface 8b follows a forth parabola. The third and fourth light deflection surfaces 8a, 8b are arranged on the shell surface 3c in such a way, that the third and fourth parabola have a common second focal point fp2.

The second light beam following the second light beam path LB2 is incident on the third light deflection surface 8a and is deflected to the forth light deflection surface 8b, and the deflected second light beam is incident on the forth light deflection surface 8b and is deflected to the light output section 3b for coupling out of the optic body 3.

The light output section 3b comprises a second light exit surface 7b. The second pair of optically operative surfaces 8 and the light output section 3b are arranged in such a way, that the light beam deflected by the fourth light deflection surface 8b is incident on the second light exit surface 7b. The third and fourth light deflection surfaces 8a, 8b are configured in such a way, that light rays of the second light beam are essentially parallel to each other and essentially parallel to the main direction X after being coupled out of the optic body 3. The outcoupled essentially parallel light beam has a forth vertical extent v4 in the main vertical cross section v, said forth vertical extent v4 is smaller than the third vertical extent v3. The optic body 3 acts as a beam expander and at the same time as beam compressor in the embodiment shown in FIG. 1.

The first, second, third and fourth light deflection surface 6a, 6b, 8a, 8b are arranged in such a way, that a fictional plane, which intersects the common first focal point fp1 and the common second focal point fp2, intersects the optic body 3 at an intersection line. The optical body 3 is configured in such a way that the first light deflection surface 6a lies vertically higher on the intersection line than the third light deflection surface 8a. The first and third light deflection surface 6a, 8a are arranged on a same side of the shell surface 3c of the optic body 3. The second and forth light deflection surface 6b, 8b are arranged on a same side of the shell surface 3c of the optic body 3. The first and second light deflection surface 6a, 6b have a concave curvature and the third and fourth light deflection surface 8a, 8b have a convex curvature.

FIG. 3 shows a perspective view of the optic body 3 of the second embodiment, wherein the dotted box depicts the actual optic body 3, which is a cut-out of the first pair of optically operative surfaces 6 and the second pair of optically operative surfaces 8.

Figure 5:
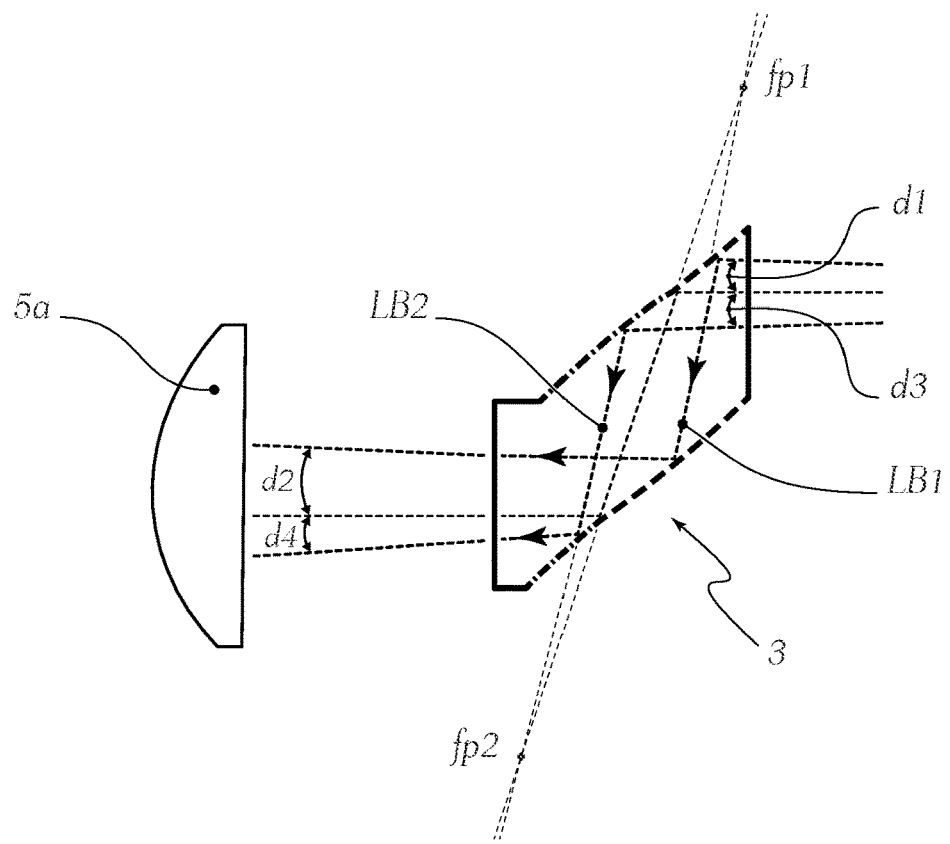
FIG. 5 another view of the illumination device according to FIG. 4.

FIG. 5 shows the second embodiment of the illumination device 1. FIG. 5 shows the illumination device according to FIG. 4, wherein the light beam paths LB1 and LB2 are indicated. The upper, at least one light beam has a divergence d1 prior to entering the optic body 3. After the at least one light beam exits the optic body 3, the at least one light beam has a divergence d2, which is smaller than the initial divergence d1, due to the widening or expansion of the at least one light beam while traveling through the optic body 3 along the beam path LB1.

The lower, second light beam has a divergence d3 prior to entering the optic body 3. After the second light beam exits the optic body 3, the second light beam has a divergence d4, which is greater than the initial divergence d3, due to the compression of the second light beam while traveling through the optic body 3 along the beam path LB2. The divergence d4 of the second (lower) light beam is also greater than the divergence d2 of the at least one light beam (the upper, first light beam). As a result, the upper light beam hitting the optical element 5a has a reduced chromatic aberration.

Figure 6:
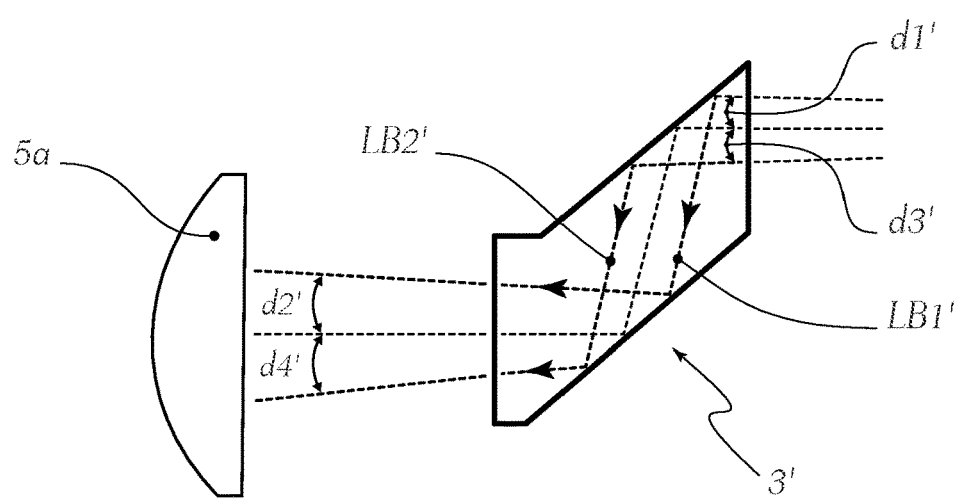
FIG. 6 an illumination device according to the prior art.

FIG. 6 shows a prior art illumination device having a standard planar optic body 3'. The upper light beam has a divergence d1' prior to entering the optic body 3'. After the upper light beam exits the optic body 3', the upper light beam has a divergence d2', which is equal to the initial divergence d1'. The divergence of the upper light beam remains unchanged while traveling through the optic body 3' along the beam path LB1'.

The lower light beam has a divergence d3' prior to entering the optic body 3'. After the lower light beam exits the optic body 3', the lower light beam has a divergence d4', which is equal to the initial divergence d3'. The divergence of the lower light beam remains unchanged while traveling through the optic body 3' along the beam path LB2'. In this case, due to the planar optic body 3', d1'=d2'=d3'=d4'. As a result, the light beams hitting the optical element 5a have a higher chromatic aberration.

The invention claimed is:

1. An illumination device (1) for a motor vehicle headlamp for generating a light distribution, the illumination device (1) comprising: a light source (2) configured to emit at least one light beam in a main direction (X) of the illumination device (1); an optic body (3) arranged downstream of the light source (2) along the main direction (X), wherein the optic body (3) comprises: a light input section (3a) for coupling the light beam from the light source (2) into the optic body (3), said light input section (3a) comprising a light collecting element (4), which is assigned to the light source (2) and is configured to couple the light beam from the assigned light source (2) into the optic body (3) in such a way, that light rays forming the light beam are essentially parallel to each other and essentially parallel to the main direction (X) after being coupled into the optic body (3), wherein the parallel light beam has a first vertical extent (v1, v1') in a main vertical cross section (v)—seen in a correct installed state of the illumination device (1) in a vehicle—, when being coupled into the optic body (3), said main vertical cross section (v) is parallel to the main direction (X), a light output section (3b) for decoupling the light beam coupled into the optic body (3) via the light input section (3a), out of the optic body (3) in the main direction (X), and a shell surface (3c) limiting the optic body (3), said shell surface (3c) is configured to deflect the light beam coupled into the optic body (3), which shell surface (3c) extends between the light input section (3a) and the light output section (3b); and an optical system (5), comprising at least one optical element (5a), arranged downstream of the optic body (3) along the main direction (X) in order to receive the light beam emitted from the light output section (3b) of the optic body (3), wherein the optical system (5) is configured to project the light beam in front of the illumination device (1), wherein the optical system (5) in combination with the light source (2) and the optic body (3) are configured to generate the light distribution, and wherein: the optic body (3) comprises a first pair of optically operative surfaces (6) for guiding the light beam coupled into the optic body (3) via the light input section a) along a first light beam path (LB1) from the light input section (3a) to the light output section (3b), the first pair of optically operative surfaces (6) consists of a first and second light deflection surface (6a, 6b), wherein the first and second light deflection surfaces (6a, 6b) are arranged on the shell surface (3c), wherein the optic body (3) comprises a first and a second side arranged opposite to each other, wherein the first light deflection surface (6a) is arranged on the first side and the second light deflection surface (6b) is arranged on the second side of the optic body (3), in the main vertical cross section (v) the first light deflection surface (6a) follows a first parabola, wherein the second light deflection surface (6b) follows a second parabola, wherein the first and second light deflection surfaces (6a, 6b) are arranged on the shell surface (3c) in such a way that the first and second parabola have a common first focal point (fp1), the light beam following the first light beam path (LB1) is incident on the first light deflection surface (6a) and is deflected to the second light deflection surface (6b), and the deflected light beam is incident on the second light deflection surface (6b) and is deflected to the light output section (3b) for coupling out of the optic body (3), the light output section (3b) comprises a first light exit surface (7a), wherein the first pair of optically operative surfaces (6) and the light output section (3b) are arranged in such a way, that the light beam deflected by the second light deflection surface (6b) is incident on the first light exit surface (7a), and the first and second light deflection surfaces (6a, 6b) and the first light exit surface (7a) are configured in such a way, that light rays forming the light beam are essentially parallel to each other and essentially parallel to the main direction (X) after being coupled out of the optic body (3), wherein the outcoupled parallel light beam has a second vertical extent (v2, v2') in the main vertical cross section (v), said second vertical extent (v2, v2') is greater than the first vertical extent (v1, v1'); wherein the light source (2) is configured to emit a second light beam, wherein the optic body (3) comprises a second pair of optically operative surfaces (8) for guiding the second light beam coupled into the optic body (3) via the light input section (3a) along a second light beam path (LB2) from the light input section (3a) to the light output section 3b), wherein the second light beam has a third vertical extent (v3) in the main vertical cross section (v), when being coupled into the optic body (3), wherein the second pair of optically operative surfaces (8) consists of a third and fourth light deflection surface (8a, 8b), wherein the third and fourth light deflection surfaces (8a, 8b) are arranged on the shell surface (3c), wherein the third light deflection surface (8a) is arranged on the first side and the forth light deflection surface (8b) is arranged on the second side of the optic body (3), wherein in the main vertical cross section (v) the third light deflection surface (8a) follows a third parabola, wherein the forth light deflection surface (8b) follows a forth parabola, wherein the third and fourth light deflection surfaces (8a, 8b) are arranged on the shell surface (3c) in such a way, that the third and fourth parabola have a common second focal point (fp2), wherein the second light beam following the second light beam path (LB2) is incident on the third light deflection surface (8a) and is deflected to the forth light deflection surface (8b), and wherein the deflected second light beam is incident on the forth light deflection surface (8b) and is deflected to the light output section (3b) for coupling out of the optic body (3), wherein the light output section (3b) comprises a second light exit surface (7b), wherein the second pair of optically operative surfaces (8) and the light output section (3b) are arranged in such a way, that the light beam deflected by the fourth light deflection surface (8b) is incident on the second light exit surface (7b), and wherein the third and fourth light deflection surfaces (8a, 8b) are configured in such a way, that light rays of the second light beam are essentially parallel to each other and essentially parallel to the main direction (X) after being coupled out of the optic body (3), wherein the outcoupled essentially parallel light beam has a forth vertical extent (v4) in the main vertical cross section (v), said forth vertical extent (v4) is smaller than the third vertical extent (v3).

2. The illumination device (1) according to claim 1, wherein the first, second, third and fourth light deflection surface (6a, 6b, 8a, 8b) are arranged in such a way, that a fictional plane, which intersects the common first focal point (fp1) and the common second focal point (fp2), intersects the optic body (3) at an intersection line, wherein the optical body (3) is configured in such a way that the first light deflection surface (6a) lies vertically higher relative to the intersection line than the third light deflection surface (8a).

3. The illumination device (1) according to claim 2, wherein the generated light distribution comprises a first partial light distribution and a second partial light distribution, wherein the at least one light beam coupled out of the first light exit surface (7a) forms the first partial light distribution, wherein the second light beam coupled out of the second light exit surface (7b) forms the second partial light distribution.

4. The illumination device (1) according to claim 3, wherein a center of the first partial light distribution is closer to the 0° line of the VV-line than a center of the second partial light distribution.

5. The illumination device (1) according to claim 1, wherein the generated light distribution is a low beam light distribution, wherein a vertical extension of the low beam light distribution extends along a VV-line from at least 0° down to at least −10° on the VV-line.

6. The illumination device (1) according to claim 1, wherein the first and third light deflection surface (6a, 8a) are arranged on a same side of the shell surface (3c) of the optic body (3).

7. The illumination device (1) according to claim 1, wherein the second and forth light deflection surface (6b, 8b) are arranged on a same side of the shell surface (3c) of the optic body (3).

8. The illumination device (1) according to claim 1, wherein the first and second light deflection surface (6a, 6b) have a concave curvature and the third and fourth light deflection surface (8a, 8b) have a convex curvature.

9. The illumination device (1) according to claim 1, wherein light rays forming the at least one light beam have a first divergence (d1) in the main vertical cross section (v) along the main direction (X), wherein the light rays forming the at least one light beam after being coupled out of the optic body (3) have a second divergence (d2) in the main vertical cross section (v), wherein said second divergence (d2) is smaller than the first divergence (d1).

10. The illumination device (1) according to claim 1, wherein light rays forming the second light beam have a third divergence (d3) in the main vertical cross section (v) along the main direction (X), wherein the light rays forming the second light beam after being coupled out of the optic body (3) have a fourth divergence (d4) in the main vertical cross section (v), wherein said fourth divergence (d4) is greater than the third divergence (d3).

11. A motor vehicle headlamp, comprising the illumination device (1) according to claim 1.

12. A motor vehicle headlamp, comprising the illumination device (1) according to claim 1.

* * * * *